United States Patent [19]

Jensen

[11] 4,042,847

[45] Aug. 16, 1977

[54] LIQUID-FILLED SUBMERSIBLE ELECTROMOTOR

[75] Inventor: Poul Due Jensen, Wahlstedt, Holstein, Germany

[73] Assignee: Grundfos A/S, Bjerringbro, Denmark

[21] Appl. No.: 593,864

[22] Filed: July 7, 1975

[30] Foreign Application Priority Data

July 10, 1974 Germany ............................ 2433045
July 10, 1974 Germany ............................ 2423420
July 10, 1974 Germany ............................ 2423431

[51] Int. Cl.² ............................................. H02K 5/12
[52] U.S. Cl. ......................................... 310/87; 310/90
[58] Field of Search ................... 310/87, 157, 88, 85, 310/91, 90, 86; 417/420; 415/170 A; 308/36.1, 36.3, 141, 146–148, 134.1

[56] References Cited

U.S. PATENT DOCUMENTS

| | | | |
|---|---|---|---|
| 2,301,340 | 11/1942 | Spengler | 310/87 |
| 3,270,224 | 8/1966 | Turk | 310/87 |
| 3,384,769 | 5/1968 | Schaefer | 310/87 |
| 3,502,919 | 3/1970 | Boyd | 310/87 |
| 3,671,786 | 6/1972 | Jones | 310/87 |
| 3,904,256 | 9/1975 | Pfeifer | 308/141 |
| 3,947,153 | 3/1976 | Matthias | 308/134.1 |

*Primary Examiner*—R. Skudy

[57] ABSTRACT

A liquid-filled submersible electromotor, especially motor has in one end rotating sealing means for sealingly closing the water-filled space in the motor casing, the sealing means being adapted to automatically release over-pressure in that space and to allow passage of water from the space to the space surrounding the casing, and vice versa. At the other end the motor casing has a bearing for the motor shaft, preferably of the Michell type, wherein one sliding surface is constituted by an annular member of a non-metallic material, preferably ceramics, and the other by movable blocks, also of non-metallic material.

4 Claims, 11 Drawing Figures

LIQUID-FILLED SUBMERSIBLE ELECTROMOTOR

The invention relates to a submersible electromotor having a closed casing containing an amount of water which serves to lubricate bearings for the motor shaft which extends through a wall of the casing, and the wall is provided with a shaft seal consisting of a non-rotating or stationary slide ring, connected with the wall, and a rotatable slide ring connected with the shaft, the slide rings having radial sliding surfaces resting against each other.

In liquid-filled submersible motors it is endeavored to prevent the exchange of liquid with the surroundings. For this purpose one wall of the motor is made movable, being for example, made as a rubber diaphragm, in order to provide an equalisation of the volume by temperature variations of the liquid. However, practice has disclosed that such equalising elements are influenced by pressure differences between the motor compartment and the surroundings.

to protect the equalising element from damage, the motor may be provided with a pressure safety device which may be built in at various places of the motor. The pressure safety device consists of a spring-loaded valve. As there is no relative movement between the valve body and the valve seat, foreign bodies may become wedged between the sealing surfaces when the valve closes, so that communication is established between the motor compartment and the surrounding through the valve, if only partially closed, with a consequent undesired exchange of the liquid.

One object of the invention is to provide a pressure safety device for the motor by means of which device pressure safety is obtained without the use of special components, but by means of available machine elements, and without involving the aforesaid drawback.

For the solution of this problem the slide ring seal is formed in such manner as to take over the function of the pressure safety device. The slide ring seal consists of the stationary sealing ring mounted in the casing and sealed against same, and of the rotatable sealing ring mounted on the shaft and sealed against the component.

An essential feature of the motor according to the invention is that the non-rotating or stationary slide ring is connected with the casing by means of a supporting member which is adapted to be acted upon by the pressure inside the casing and, overcoming a resilient resistance, to be moved by the pressure so that the non-rotating slide ring is carried away from the rotating side ring. The non-rotating slide ring and the supporting member being so formed and disposed that the gap produced between the sliding surfaces by the movement of the slide ring provides communication between the compartment of the electromotor and the space outside same.

In an exemplary embodiment according to the invention the seal acts as an excess pressure valve. If a pressure arises in the sealed compartment, by which the diaphragm is displaced towards the spring, the sealing gap opens and the excessive pressure is relieved. In the radial sealing gap liquid is passed outwards whereby in the adjoining spaces a pressure is built up. The axial slide ring seal may thus be considered as a kind of centrifugal pump.

The invention also includes another shaft bearing which is preferably of the Michell type, consisting of a flange member which is attached to the shaft end and carries a radial sliding surface facing away from the shaft and a supporting member for another sliding surface provided in the casing and cooperating with the firstmentioned sliding surface. Segment thrust bearings with movable blocks are capable of absorbing a load several times greater than that of rigid axial bearings and they are therefore used wherever heavy forces are to be transmitted. Such bearings give satisfactory operation when liquid friction is obtainable under available operational conditions.

When the pump is started and stopped the bearing will be reasonably dry. The shaft bearing will therefore be subjected to the action of forces when the pump is regulated by engagement and disengagement and when the bearing is of limited small dimensions. This is the case in submersible motors for operating boring tube pumps.

In such a motor connection to the electric mains is by a long cable suitable for the purpose, provided with a plug connection between the cable and the upper side of the motor. Since the plug connection is located beneath the water level of the well, short circuiting may occur by penetration of well water into the plug connection. The plug connection will therefore have to be perfectly tight when under pressure.

Accordingly, the present application also relates to a motor with a cylindrical hole in the casing from the bottom of which there project electrically conducting plug pins which are connected with the electric circuit of the motor and are adapted to be received in corresponding sleeves provided in a cylindrical plug inserted into the hole and having a filler body made of an elastic, electrically insulating material such as rubber which surrounds the plug pins completely. In addition there are clamping means for pressing the plug into the cylindrical hole, the filler body and the hole casing being so formed that the pressing of the filler body into the cylindrical hole involves such an expansion of the innermost portion of the filler body, which portion surrounds portions of the plug pins that are located outside the sleeves, that the innermost portion is forced into a transverse direction against the portions of the plug pins.

The invention will now be described with reference to the drawing, in which

FIG. 1 shows a section of the upper portion of exemplary electromotor according to the invention, viewed from the side;

FIG. 2 a section of the lower portion of the motor, viewed from the side.

FIG. 3 shows a part of FIG. 2 on a larger scale;

FIG. 4 a section of a portion of a thrust bearing, viewed from the side;

FIG. 5 the upper part of FIG. 1, showing an optional electric connecting plug inserted;

Figure 1:
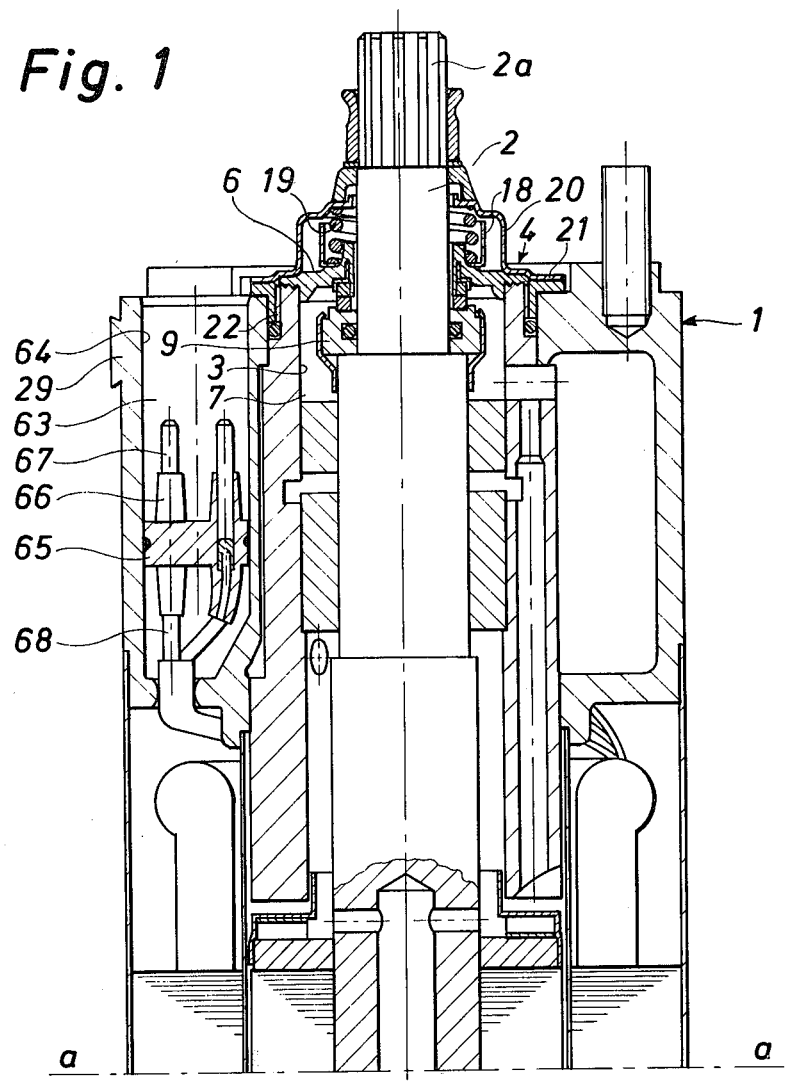
Figure 3:
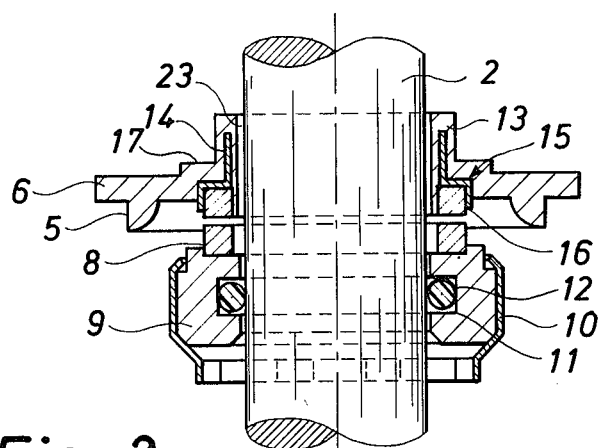
Figure 2:
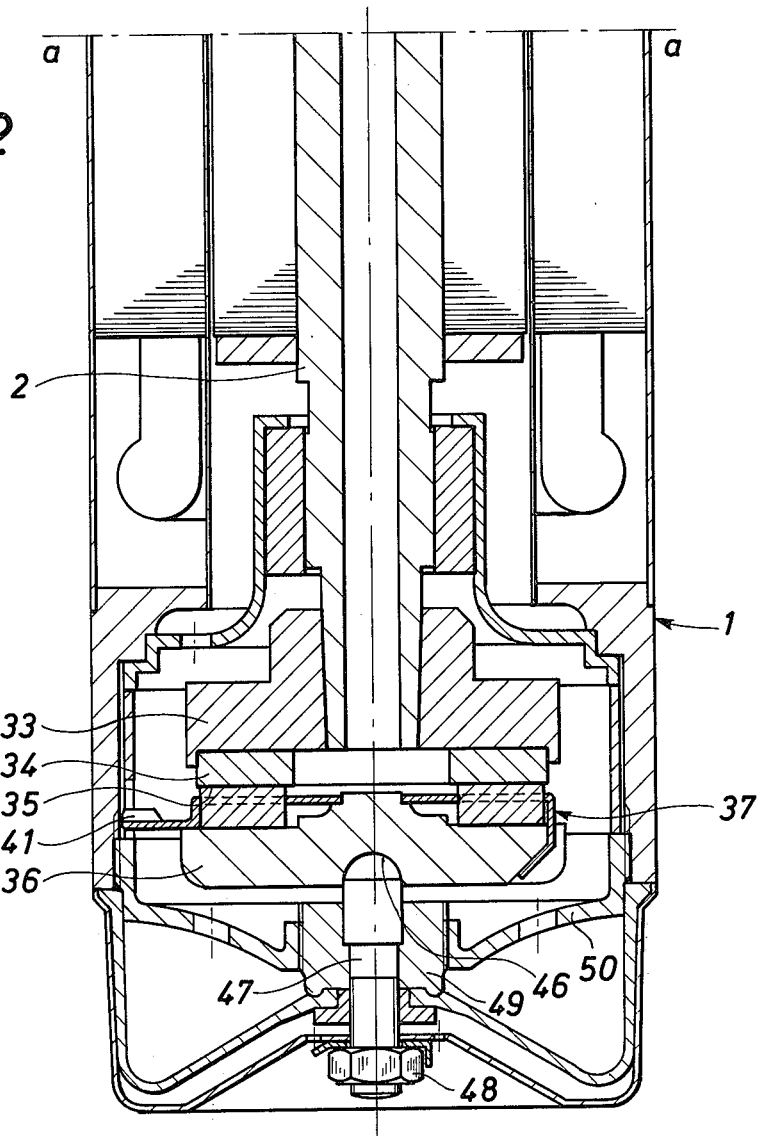

The inventive electromotor is illustrated by two FIGS. divided along the dot-dash line a—a of FIGS. 1 and 2. The electromotor has a casing 1 which is totally closed and contains an amount of water serving to lubricate the bearings of a motor shaft 2 which has an upper fluted portion 2a adapted to be connected with a pump shaft. The motor is used substantially in its vertical position in a well hole or bore hole as illustrated in the FIGS.

At its upper end the casing 1 has a bore 3 which opens into an upper wall 4 of the casing and in which there is mounted a cylindrical portion 5 of a diaphragm 6 which may be of rubber or plastic. The diaphragm covers thus a part of the wall of the casing, closing the casing in relation to a compartment 7 of the bore 3, which communicates with other spaces in the motor casing.

Adjacent to the wall 4 is a rotatable shaft seal consisting of a rotatable slide ring 8 attached to a supporting member 9 which by means of a holder 10 is rigidly connected to the shaft 2. In a groove 11 in the supporting member 9 there is embedded an O-ring 12 of an elastic material.

The diaphragm 6 has a hub portion 13 in which there is embedded a tubular portion 14 of holder 15 for a stationary slide ring 16 the radial sliding surface of which abuts the radial sliding surface of the slide ring 8.

Around the hub portion 13 the diaphragm has a collar 17 against which an inwardly directed flange on a tubular member 18 is resting. The upper side of the said flange forms a support for the lower end of a helical spring 19 the upper end of which is resting against a bowl-shaped member 20 having an outwardly directed flange 21 which is forced against the upper side of the edge portion of an diaphragm 6 by means of a screw-threaded tubular extension 22 of the member 20.

Between the non-rotatable slide ring 16 and the shaft 2, and between the hub portion 13 and the shaft 2 is a clearance 23 connecting the gap between the sliding surfaces of the two slide rings 8 and 16 with the space in the bowl-shaped member 20, the space communicating with the space surrounding the motor casing through opening (not shown).

During normal operating conditions the surfaces of the rings 8 and 16 are sliding against each other, and the compartment 7 of the casing is thus sealed against the surroundings. If there is lack of water in the motor casing, the gap between the two sliding surfaces of the rings 8 and 16 may act as a centrifugal pump and pass water from the surroundings of the motor through the space in the member 20 and the gap 23 into the compartment 7, thus supplementing the amount of water contained therein.

If for some reason a pressure arises inside the casing in excess of the pressure exerted by the surroundings and the spring 19, the pressure in the compartment 7 will act on the underside of the diaphragm 6 and thereby raise the slide ring 16 clear of the slide ring 8 so as to form a gap between the sliding surfaces, by which water or air may escape through the gap 23 to the surroundings. Sealing for the slide ring 8 is provided by means of the O-ring 12.

The bearings for the motor shaft includes an axial thrust bearing, preferably of the Michell type, indicated in FIG. 2 and consisting of a flanged member 33 which is attached to the motor shaft 2 and in its downwardly directed end carries an annular sliding member 34 of ceramics with a downwardly directed plane-ground sliding surface 35.

Figure 4:
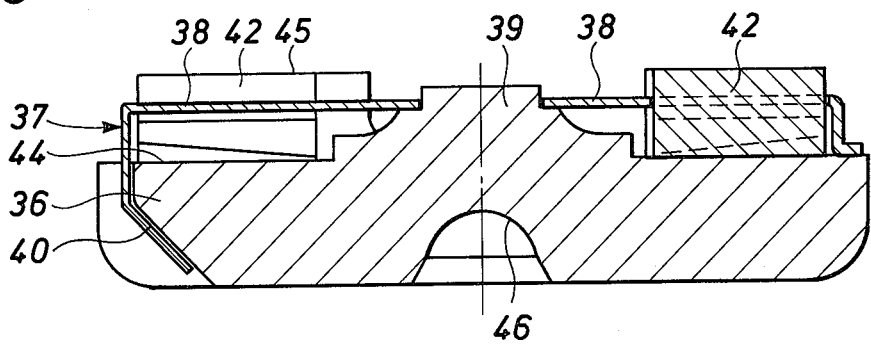

The other portion of the thrust bearing consists of a disc-shaped member 36, preferably a cast part, on which is provided a grid-like member 37 having spokes 38 (FIG. 4) extending radially from a hub 39 and interconnected at the periphery by means of an annular part having downwardly bent flaps 40 received in recesses of the member 36, thus preventing that member from turning in relation to the grid-like member 37. The latter has further a vane 41 which engages behind a projection in the casing 1 so that it is prevented from rotating about the axis of the motor shaft 2.

Figure 9:
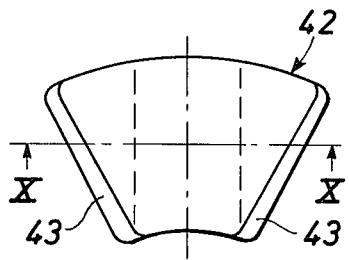
FIG. 9 is a top view of a sliding block.
Figure 10:
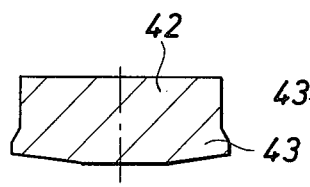
FIG. 10 is a section taken on the line X—X of FIG. 9.
Figure 11:
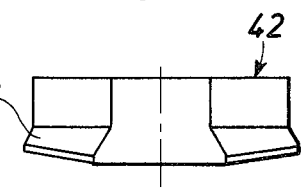
FIG. 11 is an end view of the sliding block.

In the spaces between the spokes 38 are provided sliding blocks 42, FIGS. 9–11, preferably of carbon material and having outwardly projecting parts 43, and being located between the spokes 38 and a surface 44 of the supporting member 36, thus preventing the sliding blocks from falling out.

As will appear from FIGS. 10 and 11, the under surface of the sliding blocks are chamfered so as to permit the blocks to rock about axes extending radially in relation to the supporting member, by which perfect contact between an upwardly facing sliding surface 45 and the sliding surface 35 is obtained.

The support member 36 has a concave spherical surface 46 resting on a corresponding spherical surface of a supporting bolt 47 the axial position of which may be adjusted so that the bearing may be tightened by turning the bolt 47. The bolt is fixed by means of a nut 48. The supporting member 36 may tilt as a whole by means of the spherical surfaces and thus adjust itself to exact contact between the sliding surfaces. The bolt 47 is screwed into a hub 49 which is carried by a resilient, bowl-shaped member 50 so that forces due to shock loads are absorbed by the element 50.

On one side of the shaft 2 the casing has a hole 63 formed by a sleeve 64 which has a bottom piece 65 with upwardly extending hub portions 66 of electrically insulating material. The hub portions 66 carry plug pins 67 of electrically conducting material, and the plug pins are connected with the electric circuit of the motor by means of cables 68.

Figure 6:
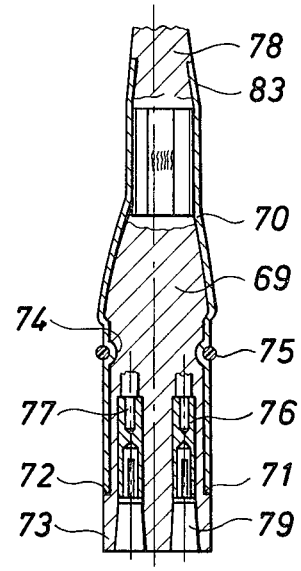
FIG. 6 is a view of the plug alone.

FIG. 6 shows a plug consisting of a filler body 69 of elastic, electrically insulating material, preferably rubber, which is surrounded by a metal casing 70 having at its lower end an end surface 71 resting against a circumferential shoulder 72 of the filler body so that a lower end portion 73 of the body has a surface which is flush with the outer surface of the casing 70 so as to form a continuous cylindrical body fitting exactly to the sleeve 64.

The outer surface of the casing is provided with a circumferential groove 74 formed by a depression, and in that groove is embedded an O-ring 75 of elastic material, preferably rubber.

In the filler body 69 are inserted metal sleeves 76 of an inside diameter identical to the outer diameter of the plug pins 67 and connected with cables 77 extending up through the filler body 69 and joined to form a completely insulated cable 78 which may be connected to the mains for feeding the motor with current.

When the cable is to be joined, the cylindrical portion of the casing 70 is inserted into the sleeve 64 and the casing plus the filler body will fill out the hole 63 completely, the hub portions 66 being received in corresponding bores 79 provided in the plug. The O-ring 75 will rest in contact with the inner wall of the sleeve 64 and provide sealing between the hole 63 and the surroundings.

Figure 5:
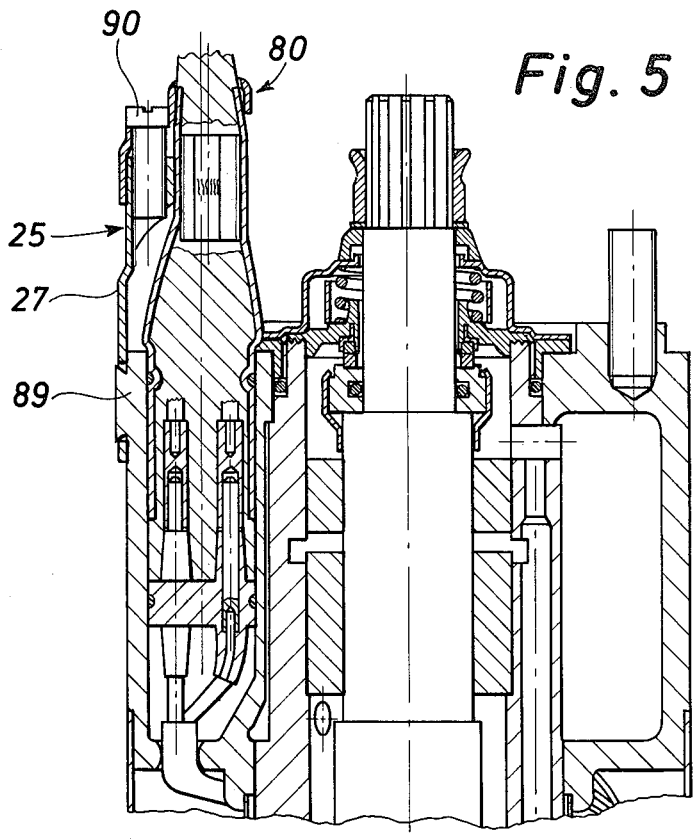
Figure 7:
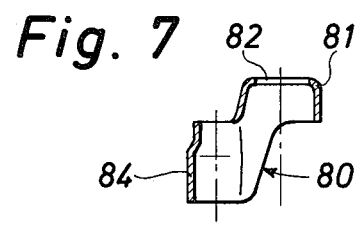
FIG. 7 and 8 are sections of clamping devices, viewed from the side.

The member shown in FIG. 7, denoted by 80 as a whole, has a tubular portion 81 with a hole 82 which is mounted around an upper portion 83 of the casing 70. The member 80 has furthermore a tubular portion 84 which is located on one side of the portion 81. The location of the member 80 is indicated in FIG. 5.

Figure 8:
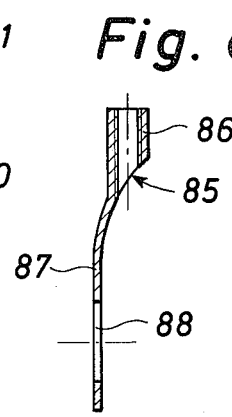

FIG. 8 shows another member 85 which has a tubular portion 86 with an inside screw-thread and is adapted to be received in the tubular portion 84. The portion 85 has furthermore a strip portion 87 with a hole 88 which is adapted to engage a projection 89 on the casing 1 as will appear from FIG. 5. By means of a screw 90 which is passed through the hole 82 and screwed into the thread of the tubular portion 86 it is possible to exert a downward pressure on the casing 70 so that the casing and the filler body 69 are pressed into the hole 63. By this pressure, which is not prevented by any transverse parts, the end surface 71 of the casing is forced against the shoulder 72 and thereby subjects the lower portion 73 of the filler body to a heavy pressure so that the filler body is pressed in radial direction, and the inner surfaces of the bore 79 are pressed firmly against the outer surfaces of the hub portions 66, and any open space and film of water therebetween are thereby eliminated.

I claim:

1. A submersible electromotor of the kind being lodged in a totally closed, substantially vertically disposed casing, there being a compartment defined within the electromotor and within said casing, surrounding the electromotor; said casing containing an amount of water which serves to lubricate bearings for a shaft of the electromotor, which extends through a wall of said casing; the electromotor being fitted with shaft seal means in said casing wall, consisting of a stationary slide ring connected with said wall, and a rotatable slide ring connected with said shaft; said slide rings having radial sliding surfaces that abut each other and define a gap therebetween; said stationary slide ring mounted on, and connected with said casing by means of an elastic supporting member that is subjected to the pressure inside said casing, and against movable biasing means, so that said stationary slide ring is moved away from said rotatable slide ring; said supporting member being further defined by a resilient diaphragm connected at its periphery with said casing wall and also with said rotatable slide ring in such a manner as to form a passage for the water between said sliding surfaces and a surface of said diaphragm that faces away from said rotatable slide ring; the pressure in said compartment being capable of acting directly on a substantial area of said supporting member so that said compartment is effectively vented of possible over pressure as a result of air and water escaping therefrom by communication through said gap between the slide rings.

2. The electromotor as defined in claim 1, wherein an edge portion of said diaphragm is tightened against a surface of said casing wall by means of a bowl-shaped member that has said compartment defined therein and through the bottom of which said shaft extends; one end of a helical spring resting on said bottom, which spring constitutes said biasing means, and its other end resting on a collar provided on said diaphragm outside a hub portion that extends away from said rotatable slide ring, and contains an embedded tubular portion of another supporting member for said rotatable slide ring; clearance being provided between said rotatable slide ring and said shaft, and between said hub portion and said shaft, said compartment in the bowl-shaped member communicating with said compartment surrounding the electromotor.

3. A submersible electromotor of the kind being lodged in a totally closed, substantially vertically disposed casing, there being a compartment defined within the electromotor and within said casing, surrounding the electromotor; said casing containing an amount of water which serves to lubricate bearings for a shaft of the electromotor, which extends through a wall of said casing; the electromotor being fitted with shaft seal means in said casing wall, consisting of a stationary slide ring connected with said wall, and a rotatable slide ring connected with said shaft; said slide rings having radial sliding surfaces that abut each other and define a gap therebetween said stationary slide ring being mounted on, and connected with said casing by means of an elastic supporting member that is subjected to the pressure inside said casing, and against movable biasing means, so that said stationary slide ring is moved away from said rotatable slide ring; an axial thrust bearing mounted at one end of said casing, and consisting of a flanged member attached to the end of said shaft; said flange member having a radial annular sliding surface of ceramic material that faces away from said shaft; another supporting member for a further sliding surface, cooperating with the first-mentioned sliding surface and mounted in aid casing; and said further sliding surface consisting of a number of movable blocks of a non-metallic material, arranged in a circle; the pressure in said compartment being capable of acting directly on a substantial area of said supporting member so that said compartment is effectively vented of possible over pressure as a result of air and water escaping therefrom by communication through said gap between the slide rings.

4. The electromotor as defined in claim 3, wherein said other supporting member is mounted on a spherical surface of a holder member which is adjustable in the longitudinal direction of said shaft.

* * * * *